United States Patent [19]

McKiel, Jr.

[11] Patent Number: 5,287,102

[45] Date of Patent: Feb. 15, 1994

[54] METHOD AND SYSTEM FOR ENABLING A BLIND COMPUTER USER TO LOCATE ICONS IN A GRAPHICAL USER INTERFACE

[75] Inventor: Frank A. McKiel, Jr., Trophy Club, Tex.

[73] Assignee: International Business Machines Corporation, Armonk, N.Y.

[21] Appl. No.: 811,507

[22] Filed: Dec. 20, 1991

[51] Int. Cl.$^5$ .............................................. G09B 21/00
[52] U.S. Cl. .................. 340/825.19; 434/116; 345/163
[58] Field of Search ............... 340/825.19, 709, 710, 340/711, 407; 434/112, 116, 117; 358/94; 341/21

[56] References Cited

U.S. PATENT DOCUMENTS

| | | | |
|---|---|---|---|
| 3,800,082 | 3/1974 | Fish | 340/407 |
| 4,322,744 | 3/1982 | Stanton | 434/116 |
| 4,559,598 | 12/1985 | Goldwasser et al. | 340/825.19 |
| 4,979,094 | 12/1990 | Gemmell et al. | 340/825.19 |
| 5,186,629 | 2/1993 | Rohen | 434/112 |

FOREIGN PATENT DOCUMENTS 2136617 9/1984 United Kingdom ........... 340/825.19

Primary Examiner—Donald J. Yusko
Assistant Examiner—John E. Giust
Attorney, Agent, or Firm—Jonathan E. Jobe, Jr.

[57] ABSTRACT

Disclosed is a computer audio interface adapted to enable blind or visually impaired users to locate icons positioned in rows in the background of a graphical user interface. Whenever the pointer of the interface is positioned on the background, the system produces a distinctive tone. Whenever the pointer is positioned in an icon row that is occupied by one or more icons, the system produces a distinctive chord. Whenever the pointer is positioned in the background and not in an occupied row, the system produces stereo effects that give the user information as to the relative left/right position of the pointer. Whenever the pointer is positioned in an occupied row, the amplitude of the left and right stereo channels is controlled such that whenever the pointer is to the left of the leftmost icon, substantially all of the volume is produced by the left speaker and whenever the pointer is to the right of the rightmost icon, substantially all of the the volume is produced by the right speaker. Whenever the pointer is located between the leftmost and rightmost icons, the volume is balanced substantially equally between the two speakers.

19 Claims, 3 Drawing Sheets

METHOD AND SYSTEM FOR ENABLING A BLIND COMPUTER USER TO LOCATE ICONS IN A GRAPHICAL USER INTERFACE

BACKGROUND OF THE INVENTION

1. Field of the Invention

The present invention relates generally to a system and method for enabling a blind or visually impaired user to use a graphical user interface, and more particularly, to a system and method for enabling a blind or visually impaired user to locate icons in a graphical user interface.

2. Description of the Prior Art

In recent years, there has been a move among computer application software developers toward graphical user interfaces (GUIS). In graphical user interfaces, objects are presented for users to manipulate in ways that are similar to the way that they are manipulated in the real work place. Objects, such as file cabinets, folders, documents, and printers, are displayed on the screen as icons. Users manipulate these objects with a mouse to perform desired operations. For example, to file a document in a folder that is located in a file cabinet in the real work place, the user opens the file cabinet, locates and opens the correct folder, and puts the document inside. In the electronic work place of the graphical user interface, the user performs a similar process. The user opens the file cabinet icon, locates the correct folder icon, and drops the document icon in the folder. Because this is an electronic environment, users do not have to open the folder to put the document in it. However, users have been able to use their knowledge of a real work place to perform this operation.

Normally sighted persons find graphical user interfaces intuitive and easy to work with. However, except for an occasional "beep" or "bong", graphical user interfaces are virtually silent and the vast majority of the information they provide to the user is visual. Thus, graphical user interfaces are essentially not usable by blind or severely visually impaired people.

Blind and visually impaired computer users now benefit from many forms of adaptive technology, including speech synthesis, large-print processing, braille desktop publishing, and voice recognition. However, presently, almost none of the foregoing tools is adapted for use with graphical user interfaces. It has been suggested that programmers could write software with built-in voice labels for icons. Lazzaro, *Windows of Vulnerability*, Byte Magazine, June, 1991 page 416. Various synthetic or recorded speech solutions for making computer display screen contents available to blind persons have been suggested, for example in Golding, et. al., IBM Technical Disclosure Bulletin, Vol. 26, No. 10B, pages 5633-5636 (March 1984), and Barnett, et. al., IBM Technical Disclosure Bulletin, Vol. 26, No. 10A, pages 4950-4951 (March 1984). Recently, there has been disclosed a prototype of a system called IBM Screen Reader/PM. Schwerdtfeger, *Making the GUI Talk*, Byte Magazine, December 1991, page 118. According to the Schwerdtfeger article, a user of the IBM Screen Reader/PM system can maneuver a mouse over the display and use the keyboard or a separate keypad, and a voice synthesizer will describe an icon the GUI has displayed or the graphical text shown on the screen. Additionally, there have been suggested systems that include a mouse with a braille transducer so that a blind user may read text and obtain certain tactile position feedback from the mouse. Comerford, IBM Technical Disclosure Bulletin Vol. 28, No. 3, page 1343 (August 1985), Affinito, et. al., IBM Technical Disclosure Bulletin Vol. 31, No. 12, page 386 (May 1989). However, while announcing various text items, either audibly or by means of a braille transducer in the mouse, may provide some information to blind user, it does not enable the user to navigate about and locate objects on the computer display screen.

There has been suggested an audible cursor positioning and pixel (picture element) status identification mechanism to help a user of an interactive computer graphics system locate data by using aural feedback to enhance visual feedback. As the cursor is stepped across the screen, an audible click is generated that varies in tone corresponding to the current status of each pixel encountered. With this combination in audible and visual cursor feedback, it becomes a simple task to identify the desired line by noting the change in tone as the cursor moves. For color display applications, each color is represented by a distinct tone so any single pixel may be distinguished from the surrounding pixels of a different color. Although the technique was originally developed for computer aided drafting, it has been suggested that this system is especially helpful for visually impaired or learning disabled users. Drumm, et. al., IBM Technical Disclosure Bulletin, Vol. 27, No. 48, page 2528 (September 1984). However, the foregoing disclosure does not suggest a means of enabling a blind user to navigate about or locate objects on the computer display screen.

Recently, in U.S. Pat. No. 5,223,828, issued Jun. 29, 1993, entitled "Method and System for Enabling a Blind Computer User to Handle Message Boxes in a Graphical User Interface", which is assigned to the assignee of the present application, a system has been proposed that permits a blind or visually impaired user to interact with message boxes within a graphical user interface. Each message box consists of an icon, explanatory text, and one or more "pushbuttons". The icon allows the user to identify visually the type of message. The text typically explains the situation and may provide assistance. The textual content may be a question or a statement. Pushbuttons provided within the message box typically allow the user to interact with the message box.

The system of U.S. Pat. No. 5,223,828 permits blind or visually impaired users to accommodate a message box by announcing the textual content of such a box when the message box first appears. Thereafter, the pushbuttons available to respond to the message box are announced in order from left to right. A homing signal was then provided for finding the message box. The homing signal increases in pitch as the mouse pointer approaches the message box. When the pointer enters the message box, the message box text and available pushbuttons are re-announced and the pointer is automatically moved to a default pushbutton. By using this system, a blind or visually impaired user may locate a message box within a computer system.

Another system and method is disclosed in U.S. patent application Ser. No. 08/022,788, filed Feb. 22, 1993, which is a continuation of abandoned U.S. patent application Ser. No. 07/746,840, filed Aug. 19, 1991, and entitled "Audio User Interface With Stereo and Filtered Sound Effects", which is assigned to the assignee of the present application. The system and method of application Ser. No. 07/746,840, permits a blind or visually impaired user to locate a mouse pointer or other graphical pointing device within the client area of a window within a graphical user interface by providing a stereo sound system and varying the intensity of the left and right audio channels to indicate the horizontal position of the mouse pointer. That system also proposes an increase in pitch of an associated sound to indicate the relative position of the pointer in the top/bottom access of the client area of the window.

Recently, in application Ser. No. 07/802,956, filed Dec. 5, 1991, entitled "Method and System for Enabling Blind or Visually Impaired Computer Users to Graphically Select Displayed Elements", which is assigned to the assignee of the present application, there is disclosed a method and system that may be used to enable a blind or visually impaired computer user to graphically select a displayed graphic element within a computer system display. A unique identifiable audible signal is associated with each displayed graphic element. A moveable cursor element or a pointer is displayed within the computer system display and a composite audible signal is periodically generated in response to the position of the moveable cursor element. The composite audible signal preferably includes elements of each identifiable audible signal associated with each displayed graphic element within a pre-determined radius of the location of the moveable cursor element. In one embodiment of that system and method, each displayed graphic element comprises multiple picture elements and the composite audible signal includes elements of each identifiable audible signal associated with each displayed graphic element having picture elements within a rotational sector of a circle having its origin at the moveable cursor element and a radius equal to the pre-determined radius.

In certain graphical user interfaces, frequently used objects that have system wide application are positioned in the background of the display screen, which is frequently called the "electronic desktop." Such objects may include printer icons and wastebin or shredder icons. The printer icons are provided so that a user may print a document or other objects by direct manipulation and shredder or wastebin icons are provided so that the user can delete a document or object by direct manipulation. Those icons are positioned on the desktop so that they will be readily available to the user without the user having to open a window that may contain them. Users are also typically given the ability to customize their interfaces by placing various objects of their own choosing on their desktop. Certain operating systems adapted for graphical user interfaces, such as IBM OS/2 Presentation Manager, provide a facility that automatically arranges the icons on the desktop in rows.

The prior art has provided certain tools by which a blind or visually impaired user may navigate within windows and find certain elements. However, there does not currently exist any tool by which a blind or visually impaired user can readily locate icons on the desktop. In the prior work on audio graphical user interfaces, the blind user has been able to wander about the screen in search of icons. When passing over an icon, certain sounds have been created or altered along with a verbal announcement of the identity of the icon using a text-to-speech synthesizer. However, this random searching process can be tiresome and time consuming to the user.

SUMMARY OF THE INVENTION

The present invention provides a method and system that provides the user of the system with audio information regarding the position of the pointer on a display screen, wherein the screen has displayed thereon a background and at least one row of spaced apart icons. The system includes, in addition to a display screen, a pointing device for manually positioning a pointer on the screen, and left and right speakers. Generally, the system generates a first distinctive sound, which, in the preferred embodiment, is a tone, from at least one of the speakers whenever the pointer is located in the background. Whenever the pointer is located in an icon row of the background that is occupied by an icon, the system generates a second distinctive sound, which, in the preferred embodiment, is a chord made up of the background tone plus another tone that is distinctive of the particular icon row in which the pointer is located. Whenever the pointer is located in the background, but not in a row, the relative volume of the tone generated by the speakers is related to the relative right/left position of the pointer on the screen. Whenever the pointer is located in an occupied icon row, the distinctive chord is generated substantially only from the right speaker whenever the pointer is located to the right of the rightmost icon in the row. Conversely, whenever the pointer is located in an occupied row and positioned to the left of the leftmost icon in the row, the sound is generated substantially only from the left speaker. Finally, whenever the pointer is located in an occupied row, but between the leftmost and rightmost icons, the sounds generated from each speaker is substantially equal to that generated by the other. Also, whenever the pointer is located on an icon, the system generates a distinctive sound.

DESCRIPTION OF THE PREFERRED EMBODIMENT

Figure 1:
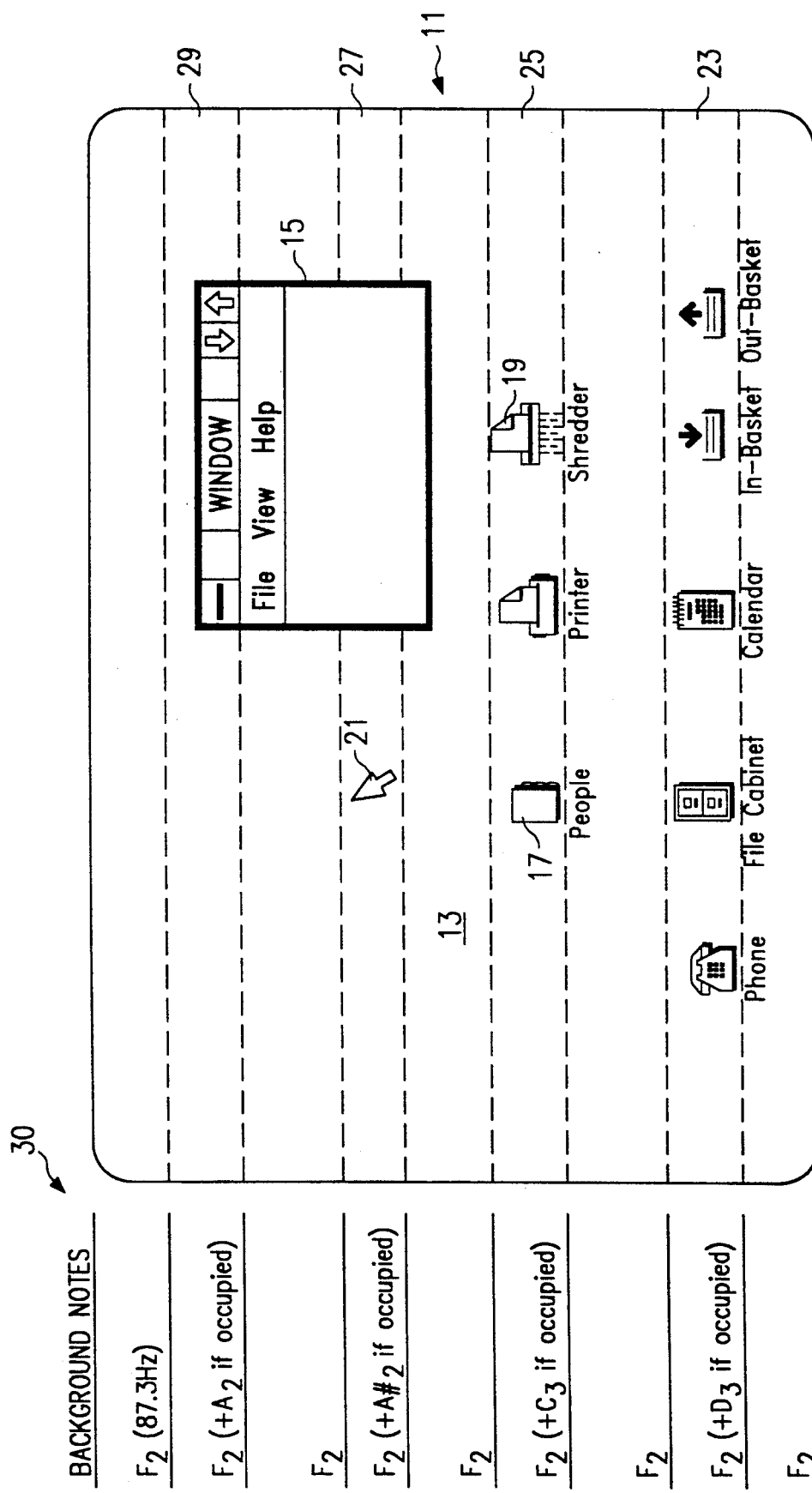
FIG. 1 is a pictorial view of a computer display screen with a plurality of rows of icons displayed thereon.

Referring now to the drawings, and first to FIG. 1, a computer display screen is designated generally by the numeral 11. Display screen 11 has displayed thereon a background 13 with a plurality of objects displayed thereon. The objects displayed on background 13 include a window 15 and a plurality of labeled icons, including a "people" or address book icon 17 and a "shredder" icon 19. Display screen 11 also has displayed thereon a pointer 21 that is moveable about the screen by means of a mouse (not shown in FIG. 1). A user of the system can operate the mouse to move pointer 21 to open, move, copy, or otherwise manipulate objects displayed on screen 11.

Background 13 is sometimes referred to as an "electronic desktop." Certain objects, such as the labeled icons of FIG. 1, may reside on the user's desktop so that they are readily available to the user. Various operating systems, such as OS/2 Presentation Manager provide a facility, which in the case of OS/2 Presentation Manager is referred to as the "Desktop Organizer", that arranges the icons on the desktop in rows. In FIG. 1, the rows into which the icons of the desktop may be organized are indicated by dashed lines, and they include, in FIG. 1, a first row 23, a second row 25, a third row 27, and a fourth row 29. The four rows of FIG. 1 are illustrative only, and the system may be adapted to create more or fewer rows than are illustrated in FIG. 1. It will be recognized, of course, that the dashed lines of FIG. 1 are for the purpose only of illustrating the present invention, and do not actually appear on display screen 11. In FIG. 1, rows 23 and 25 are occupied by icons, but rows 27 and 29 are empty or unoccupied. Nevertheless, rows 27 and 29 are available to receive icons of the desktop and those rows exist in the system.

In the present invention, audio information is provided to enable a blind or visually impaired user to locate the various rows and the icons in the rows. It will be recognized that normally sighted users may also find the present invention advantageous in operating a system with a graphical user interface. A chart 30 of background notes is located to the left of display screen 11. The background notes chart 30 is for purposes of illustration only, and does not actually appear when the invention is in use. In FIG. 1, whenever pointer 21 is located in background 13, as opposed to, for example, in window 15, or on one of the labeled icons, a background sound is produced. In the preferred embodiment, the background sound is a single tone, which for purposes of illustration, is an $F_2$ according to the American Standard pitch, adopted by the American Standards Association in 1936, which has a frequency of 87.31 Hertz. Whenever pointer 21 is located in background 13, the system produces the note $F_2$. If pointer 21 is located somewhere other than background 13, the system produces an appropriate sound effect. For example, if pointer 21 is located in window 15, the system produces the sound effects shown and described in U.S. patent application Ser. No. 07/746,840, filed Aug. 19, 1991. Similarly, if pointer 21 were positioned on shredder icon 19, the system would announce, by text-to-speech or recorded speech, "shredder".

Referring still to FIG. 1, whenever pointer 21 is positioned in an occupied row, the system produces, in addition to the background note $F_2$, an additional note that makes a distinctive chord that identifies each row. Whenever a row is not occupied, the system produces only the background note $F_2$ and not the additional note. Thus, since first row 23 is occupied, the system produces simultaneously the notes $F_2$ and $D_3$, which makes a chord. Similarly, since row 25 is occupied, the system produces the chord comprising the notes $F_2$ and $C_3$. Since third row 27 and fourth row 29 are unoccupied, the system produces only the note $F_2$. However, if rows 27 or 29 were occupied, then the appropriate chord would be produced as set forth in table 30 of background notes.

In the preferred embodiment of the invention, the system produces, in addition to tonal information with respect to the location of pointer 21, which is related generally to the vertical, or top/bottom position of pointer 21 in background 13, stereo information respecting the horizontal or left/right position of pointer 21 in background 13.

Accordingly, in the system of the preferred embodiment of the invention, a pair of laterally spaced apart stereo speakers are provided. The stereo speakers may take the form of normal audio speakers, or headphones, or the like. The system includes means, as will be described in detail hereinafter, for controlling the respective volumes of the speakers to achieve stereo effects.

In the preferred embodiment of the invention, whenever pointer 21 is positioned in background 13 and not in an occupied row, the respective volumes of the background tone produced by the speakers is related to the left/right position of pointer 21 on screen 11. However, whenever pointer 21 is in an occupied row, the stereo effect is altered such that whenever pointer 21 is to the left of the leftmost icon of the row, substantially all of the volume of the chord associated with the row is produced by the left speaker. Similarly, whenever pointer 21 is located to the right of the rightmost icon of the row, substantially all of the volume of the chord indicative of the row is produced by the right speaker. Whenever pointer 21 is located in a row between the leftmost and rightmost icons, but not on an icon, the volume is balanced equally between the left and right speakers.

Figure 2:
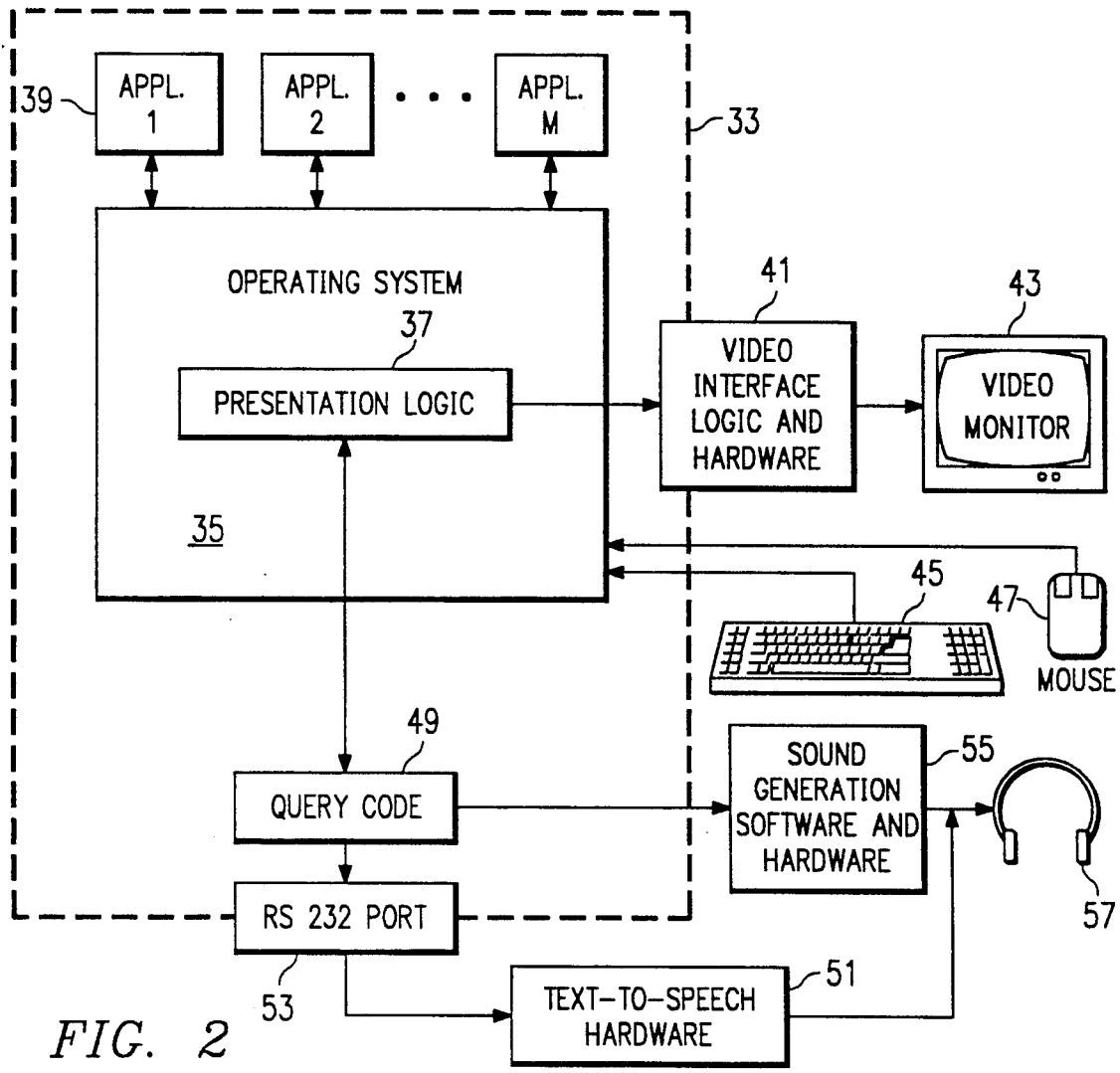
FIG. 2 is a block diagram of a preferred system of the present invention.

Referring now to FIG. 2, there is shown a block diagram of the system of the present invention. The system includes CPU hardware, which is indicated generally by dashed block 33. Running on CPU hardware is an operating system 35, which includes presentation logic 37. Presentation logic 37 manages the presentation of text and graphic information on the computer display screen. A plurality of application programs 39 are shown running on operating system 35. The system includes video interface logic and hardware 41, which supplies video information to a video monitor 43.

The system includes a keyboard 45 and a mouse 47, which allow the user to input data and operate the system. The system also includes query code, which is designated generally by the numeral 49. As will be described in greater detail, query code 49 queries the system as to the current position of pointer 21. Query code 49 also provides text information to text-to-speech hardware 51 via RS232 port 53 and sound information to sound generation software and hardware, shown generally at block 55. The speech and sound information is provided to the user by speakers or headphones 57. Text-to-speech hardware 51 is commercially available.

Figure 3:
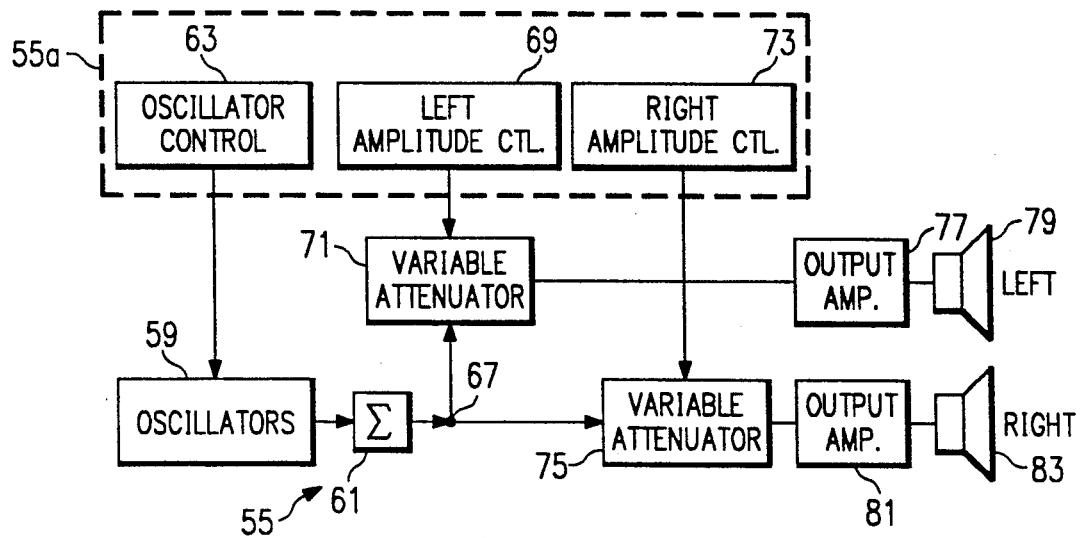
FIG. 3 is a block diagram of a preferred sound generator of the system of the present invention.

Referring now to FIG. 3, there is shown a block diagram of the sound generation software and hardware 55 of the present invention. Sound generation hardware 55 includes at least two oscillators, which are designated by the numeral 59. Oscillators 59 include at least a first oscillator, which may be fixed or variable, that produces the background note, which in the preferred embodiment is $F_2$. Oscillators 59 also includes a variable second oscillator that may be controlled to produce the secondary notes that combine with background note $F_2$ to produce the distinctive chords for occupied rows. The tones produced by oscillators 59 are summed by a summing circuit 61.

The sound generation software includes outputs that are enclosed in dashed rectangle 55a. Sound generation software outputs include an oscillator control 63, which turns on and off the various oscillators 59 and controls the frequency of the various variable frequency oscillators of oscillators 59.

The output from summing circuit 61 is split at 67 into left and right channels. A left amplitude control 69 controls a variable attenuator 71 in the left channel and a right amplitude control 73 controls a variable attenuator 75 in the right channel. The output from variable attenuator 71 is amplified by an output amplifier 77 and the audio signal is produced at left speaker 79. Similarly, the output from variable attenuator 75 is amplitude by an output amplifier 81 and produced as an audio signal at speaker 83.

Figure 4:
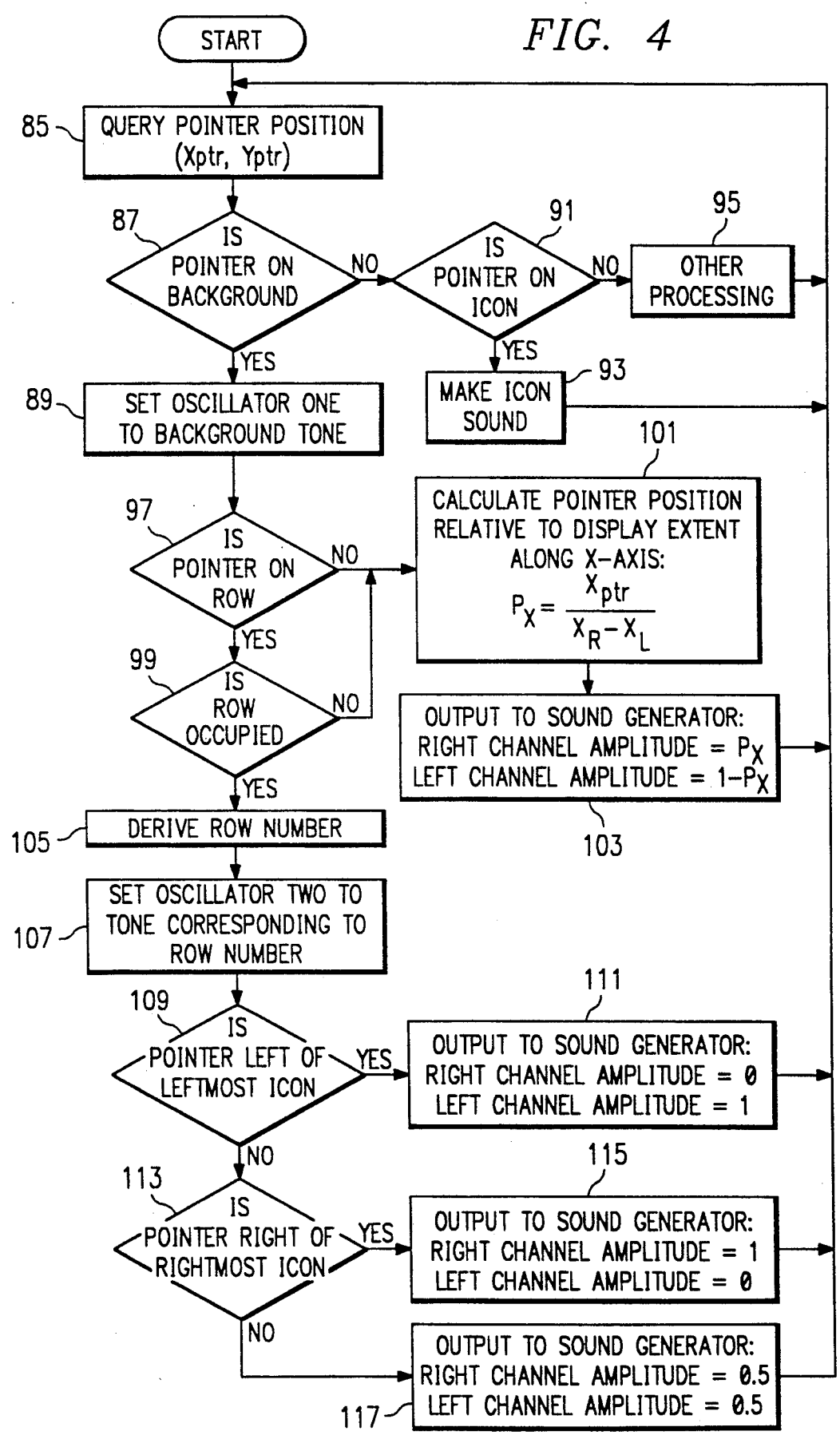
FIG. 4 is a flowchart showing a preferred software implementation of the present invention.

Referring now to FIG. 4, there is shown a flowchart of a preferred embodiment of the query code of the present invention. First, the pointer position (Xptr, Yptr) is queried at block 85. Then, the system tests, at decision block 87, whether or not the pointer is positioned on the background. If, at decision block 87, the pointer is on the background, then, at block 89, the frequency of oscillator one is set to the background tone. If, on the other hand, the pointer is not on the background, the system tests at decision block 91 whether or not the pointer is on an icon; if it is, then, as generally indicated at block 93, the system produces the appropriate icon sound, which in the preferred embodiment is an announcement of the name of the icon by text-to-speech. After the system has made the icon sound at block 93, the system returns to block 85 to continue monitoring the position of the pointer. If, at decision block 91, the pointer is not on an icon, then the system performs other processing, indicated generally at block 95. For example, if the pointer is on a window, the system processes the pointer position according to application Ser. No. 07/746,840, filed Aug. 19, 1991.

Referring again to decision block 87, if the pointer is on the background and after oscillator one has been set to the background tone at block 89, the system tests at block 97 whether or not the pointer is on a row. If the pointer is on a row, then the system tests at decision block 99 whether or not the row is occupied. If, at decision block 97, the pointer is not on a row, or if, at decision block 99, the pointer is on an unoccupied row, the system calculates, at block 101, the pointer position relative to the display extent along the X axis by the formula:

$$Px = \frac{Xptr}{Xr - Xl}$$

Where: Xr is the X coordinate of the right edge of the background; and Xl is the X coordinate of the left edge of the background.

The denominator of the foregoing formula is basically the width of the display screen. Thus, Px is a number from zero to one that reflects the position of the pointer along the X or left/right axis of the display screen. After the system has calculated the relative pointer position at block 101, the system outputs the relative amplitudes of the right and left channels to the sound generator at block 103 and returns to continue monitoring pointer position at block 85.

If, at decision blocks 97 and 99, the pointer is on an occupied row, then the system, at block 105, derives the row number corresponding to the pointer's position. Then, at block 107, the system sets oscillator number two to the tone corresponding to the row number. Referring briefly to FIG. 1, if pointer 21 were in first row 23, oscillator two would be set to the tone $D_3$. The tones related to the various row numbers can be maintained in a look-up table.

After the system has set oscillator number two to the tone corresponding to the row number the system tests at decision block 109 whether the pointer is to the left of the leftmost icon. If it is, the system, at block 111 sets the amplitude of the right channel of the sound generator to zero and the amplitude to the left channel to one and returns to block 85 to continue monitoring pointer position. If, on the other hand, the pointer is not left at the leftmost icon, the system tests at decision block 113 whether or not the pointer is to the right of the rightmost icon. If it is, the system sets the amplitude to the right channel of the sound generator to one and the amplitude to the left channel to zero at block 115 and returns to block 85 to continue monitoring pointer position. If at decision blocks 109 and 113 the pointer is neither to the left of the leftmost icon nor to the right of the rightmost icon, the system sets the output to both the right and left channels of the sound generator to 0.5 at block 117 and returns to block 85 to continue monitoring pointer position.

In operation, a user can quickly run the pointer up or down the background and identify the number and location of the rows of icons on the desktop. The chords produced when the pointer is on a row are distinctive and easily recognized by the user. After the user has located the rows, the user can quickly scan each row to find the appropriate icon. If the user hears the chord from the right speaker, the user knows that all of the icons in the row are toward the left. The user can move the pointer toward the left and hear the announcement of each icon in the row. When the pointer is between the leftmost and rightmost icons the sound is balanced between the two speakers. Thus, the user knows that there are icons both to the left and right of the pointer. After the user has moved the pointer to the left beyond the leftmost icon of the row, the balance of the chord shifts to the left speaker, thereby informing the user that there are no more icons in the row. If the user moves the pointer back toward the right, the balance will shift to the middle and then to the right. Of course, if there is only one icon in a row, the balance will be either all from the right or all from the left depending on whether the pointer is to the right or left of the single icon.

From the foregoing, it may be seen that the system and method of the present invention provides a blind or visually impaired user with audio information sufficient to enable the user to locate quickly and easily icons displayed in rows on the background of a graphical user interface. The present invention may also find use among normally sighted users who desire additional sensory input. While the invention has been particularly shown and described with reference to a preferred embodiment, those skilled in the art will understand that various changes may be made in form and detail without departing from the spirit and scope of the invention.

What is claimed is:

1. A method of providing the user of a computer system, including a display screen, a pointing device for manually positioning a pointer on said screen, a left speaker, and a right speaker, with audio information regarding the position of said pointer on said screen, wherein said screen has displayed thereon a background and at least one row of spaced apart icons, said method comprising the steps of:

generating a first sound from at least one of said speakers whenever said pointer is located on said background; and generating a second sound from at least one of said speakers whenever said pointer is located on said row.

2. The method as claimed in claim 1, wherein said first sound is a first tone.

3. The method as claimed in claim 2, wherein said second sound is a chord.

4. The method as claimed in claim 3, wherein said chord includes said first tone and a second tone.

5. The method as claimed in claim 1, wherein the relative volume of said first sound generated by said speakers is related to the relative horizontal position of said pointer on said screen.

6. The method as claimed in claim 1, wherein said row of icons is oriented horizontally on said screen and said second sound is generated substantially only from said right speaker whenever said pointer is located on said row and to the right of the rightmost icon in said row.

7. The method as claimed in claim 6, wherein said second sound is generated substantially only from said left speaker whenever said pointer is located on said row and to the left of the leftmost icon in said row.

8. The method as claimed in claim 7, wherein said second sound is generated from each of said speakers at substantially equal volume whenever said pointer is located on said row and between the leftmost and rightmost icons.

9. The method as claimed in claim 1, including the step of generating a distinctive sound whenever said pointer is located on an icon.

10. The method as claimed in claim 1, wherein more than one row of icons is displayed on said screen and including the step of generating a different sound for each of said rows.

11. Apparatus for providing the user of a computer system, including a display screen and a pointing device for manually positioning a pointer on said screen, with audio information regarding the position of said pointer on said screen, wherein said screen has displayed thereon a background and at least one row of spaced apart icons, said apparatus comprising:
   a left speaker and a right speaker;
   means for generating a first sound from at least one of said speakers whenever said pointer is located on said background; and
   means for generating a second sound from at least one of said speakers whenever said pointer is located on said row.

12. The apparatus as claimed in claim 11, wherein said means for generating said first sound includes means for generating a first tone.

13. The apparatus as claimed in claim 12, wherein said means for generating said second sound includes means for generating a chord.

14. The apparatus as claimed in claim 13, wherein said chord includes said first tone and a second tone.

15. The apparatus as claimed in claim 11, including means for controlling the relative volume of said first sound generated by said speakers relative to the horizontal position of said pointer on said screen.

16. The apparatus as claimed in claim 11, wherein said row of icons is oriented horizontally on said screen and said second sound is generated substantially only from said right speaker whenever said pointer is located on said row and to the right of the rightmost icon in said row.

17. The apparatus as claimed in claim 16, wherein said second sound is generated substantially only from said left speaker whenever said pointer is located on said row and to the left of the leftmost icon in said row.

18. The apparatus as claimed in claim 17, wherein said second sound is generated from each of said speakers at substantially equal volume whenever said pointer is located on said row and between the leftmost and rightmost icons.

19. The apparatus as claimed in claim 11, including, means for generating a distinctive sound whenever said point is located on an icon.

* * * * *